(12) United States Patent
Wang et al.

(10) Patent No.: US 11,474,618 B2
(45) Date of Patent: Oct. 18, 2022

(54) COMMUNICATION LINK BASED ON ACTIVITY ON A KEYBOARD

(71) Applicant: Hewlett-Packard Development Company, L.P., Spring, TX (US)

(72) Inventors: Jung Hsing Wang, Taipei (TW); Hsiang Ta Ke, Taipei (TW); Yi Hsien Lin, Taipei (TW); Chun Feng Li, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/297,355

(22) PCT Filed: Jul. 24, 2019

(86) PCT No.: PCT/US2019/043296
§ 371 (c)(1),
(2) Date: May 26, 2021

(87) PCT Pub. No.: WO2021/015766
PCT Pub. Date: Jan. 28, 2021

(65) Prior Publication Data
US 2022/0137720 A1    May 5, 2022

(51) Int. Cl.
*G06F 3/023* (2006.01)
*H04W 76/18* (2018.01)
*H04W 76/38* (2018.01)
*H04W 4/80* (2018.01)
*G06F 3/038* (2013.01)

(52) U.S. Cl.
CPC ............ *G06F 3/0231* (2013.01); *G06F 3/038* (2013.01); *H04W 4/80* (2018.02); *H04W 76/18* (2018.02); *H04W 76/38* (2018.02)

(58) Field of Classification Search
CPC .... G06F 3/03543; G06F 3/0231; G06F 3/038; H04W 4/80; H04W 76/18; H04W 76/38
USPC ......................................................... 345/163
See application file for complete search history.

(56) References Cited

U.S. PATENT DOCUMENTS

| | | | |
|---|---|---|---|
| 7,385,584 B2 | 6/2008 | Segre | |
| 9,094,949 B2 | 7/2015 | Robert et al. | |
| 9,619,017 B2 | 4/2017 | Samanta Singhar | |
| 9,824,836 B1 | 11/2017 | Robinson et al. | |
| 10,382,203 B1* | 8/2019 | Loladia | .............. H04L 63/06 |
| 2001/0054092 A1 | 12/2001 | Vaha-Sipila et al. | |
| 2003/0092437 A1 | 5/2003 | Nowlin et al. | |
| 2005/0243059 A1* | 11/2005 | Morris | .............. H04W 52/04 |
| | | | 345/158 |
| 2006/0217140 A1 | 9/2006 | Gunji et al. | |

(Continued)

FOREIGN PATENT DOCUMENTS

WO    WO-2009120301 A2    10/2009

*Primary Examiner* — Koosha Sharifi-Tafreshi
(74) *Attorney, Agent, or Firm* — HPI Patent Department

(57) ABSTRACT

Examples of establishing a communication link based on an activity on a keyboard are described. In an example, the activity may be detected on the keyboard of a computing device. Based on the detection, the computing device may send a request to an input device for establishing a wireless communication link with the computing device. Upon receiving an acceptance of the request by the input device, the computing device may establish the wireless communication link with the computing device.

16 Claims, 5 Drawing Sheets

(56) References Cited

U.S. PATENT DOCUMENTS

| | | | |
|---|---|---|---|
| 2008/0201438 A1 | 8/2008 | Mandre | |
| 2011/0217932 A1 | 9/2011 | Hsieh | |
| 2011/0304543 A1* | 12/2011 | Chen | G06F 3/038 345/163 |
| 2013/0031275 A1* | 1/2013 | Hanes | G06F 3/038 710/5 |
| 2013/0171939 A1* | 7/2013 | Tian | H04W 12/04 455/41.2 |
| 2014/0125575 A1* | 5/2014 | Samanta Singhar | G06F 3/038 345/156 |
| 2014/0256257 A1* | 9/2014 | Thangella | G06F 3/038 455/41.2 |
| 2016/0150582 A1* | 5/2016 | Jung | H04W 12/50 455/41.1 |
| 2019/0228192 A1* | 7/2019 | Morimoto | H04W 76/11 |

* cited by examiner

COMMUNICATION LINK BASED ON ACTIVITY ON A KEYBOARD

BACKGROUND

Computing devices, such as a desktop computer and a laptop are being used in daily lives of users for performing different tasks, such as for work and entertainment. To interact with a computing device, a user may employ an external input device. Examples of the external input device may include, but are not limited to, a wireless mouse, a keyboard, and a game controller.

BRIEF DESCRIPTION OF FIGURES

The detailed description is provided with reference to the accompanying figures, wherein.

DETAILED DESCRIPTION

Figure 1:
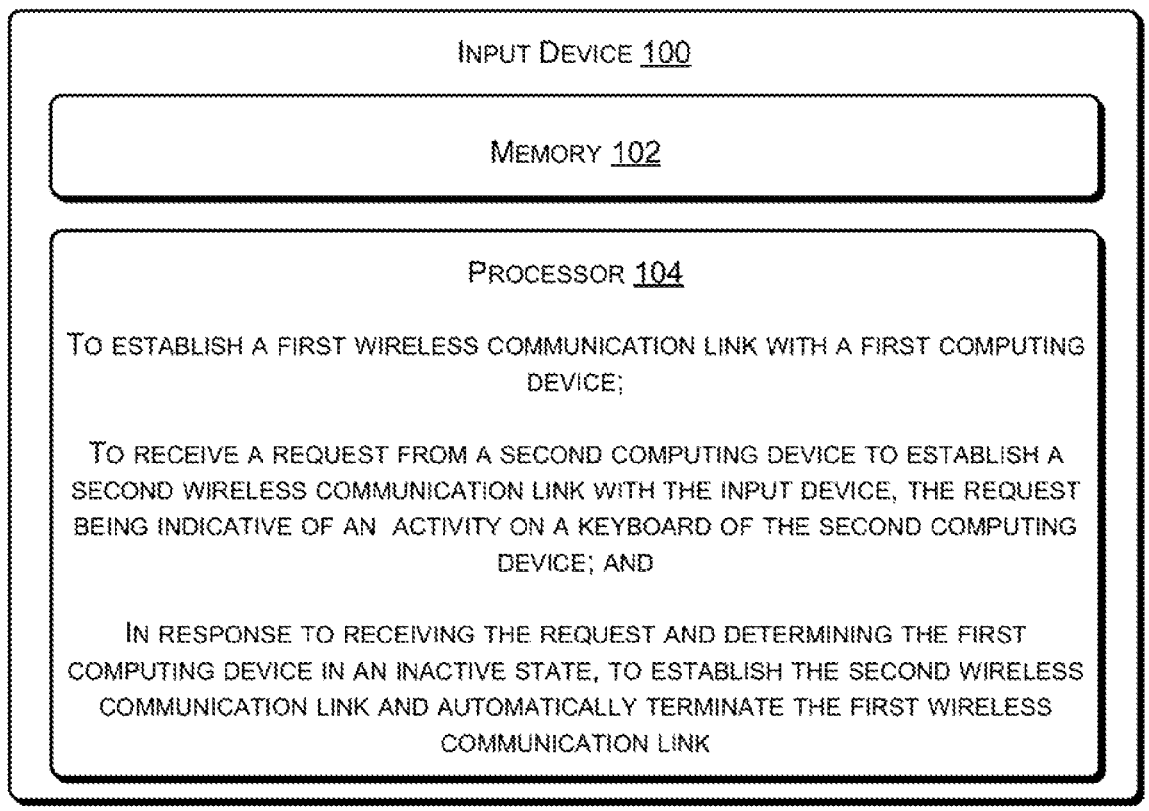
FIG. 1 illustrates an input device for establishing a communication link based on an activity on a keyboard, according to an example.

With wide variety and reduced cost of computing systems, a user may possess multiple computing devices. To interact with the multiple computing devices, the user may employ a separate input device, such as a wireless mouse or a keyboard, for each computing device. Switching back and forth amongst separate input devices, while working on multiple computing devices, may be inconvenient for the user.

To this extent, a single input device is provided for being used with multiple computing devices. The single input device may be provided with a mechanical switch for shifting amongst the computing devices. This may be bothersome to the user as the user may at times forget to manually change the switch of the input device.

In cases where the manual switch is not provided in the input device, a camera of the computing device may capture an image of the user to determine a visual orientation of the user. Based on the determination that the user is visually oriented towards a display unit of the computing device, a communication link is established between the computing device and the input device. Capturing of images and analysis of the captured images may be time-consuming and resource consuming. Moreover, while working on multiple computing devices, the user may shift gaze from one computing device to another while still working on one computer. Thus, establishment of the communication link based on the visual orientation of the user may be inaccurate.

The present subject matter discloses example approaches for establishing a communication link between an input device and a computing device based on an activity on a keyboard of the computing device. Upon determine the activity on the keyboard of a computing device, the input device may establish a communication link with the computing device and automatically disconnect an existing communication link with another computing device.

The present subject matter describes example methods and input devices for establishing a communication link based on an activity on a keyboard of a computing device. As per the present subject matter, the input device, such as a mouse, may establish a first wireless communication link with a first computing device. When the user performs any activity on a keyboard of a second computing device, the input device may receive a request for establishing a second wireless communication link with the second computing device. The input device may then determine whether a keyboard of the first computing device is still being used or not. Based on the determination, the input device may establish the second communication link or may disregard the request from the second computing device.

Accordingly, the present subject matter facilitates a user to use a single input device with multiple computing devices. The input device automatically disconnects an existing communication link with a first computing device to establish a new communication link with a second computing device.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the method and device for establishing a communication link based on an activity on a keyboard is implemented are explained in detail with respect to FIGS. 1-5. While aspects of described communication link establishment can be implemented in any number of different computing systems, environments, and/or implementations, the examples are described in the context of the following system(s).

FIG. 1 illustrates an input device 100 for establishing a communication link based on an activity on a keyboard of a computing device (not shown in FIG. 1). Examples of the input device 100 may include, but are not limited to, a wireless mouse, a wireless keyboard, and a wireless joystick. The input device 100 may include a memory 102 and a processor 104 coupled to the memory 102. The memory 102 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the processor 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

The processor 104 may establish a first wireless communication link with a first computing device (not shown). In an example, the first wireless communication link may be a short-range communication link, such as a Bluetooth link. Further, the first wireless communication link may be established upon detection on an activity on a keyboard of the first computing device. For example, when a user presses a key on the keyboard of the first computing device, the processor 104 of the input device 100 may establish the first wireless communication link.

Further, the input device 100 may receive a request from a second computing device (not shown) for establishing a second wireless communication link with the input device 100. For example, the input device 100 may receive the request while being in communication with the first computing device. The request may be indicative of an activity on a keyboard of the second computing device. For instance, when the user starts typing on the keyboard of the second computing device, a beacon signal may be received by the input device 100. The beacon signal may include an identifier of the second computing device along with a current state of the second computing device.

Upon receiving the request, the processor 104 may determine whether or not the first computing device is in an active state. The active state may be indicative of usage of a keyboard of a computing device before expiry of a predetermined time period. For example, when the keyboard of the computing device is in use before expiry of 10 milliseconds since last usage, the computing device is considered to be in the active state. When the keyboard of the computing device is not in use for more than 10 milliseconds, the computing device is said to be in an inactive state.

In response to determining the first computing device in the inactive state, the processor 104 may accept the request received from the second computing device and may establish the second wireless communication link. Further, the processor 104 may automatically terminate the first wireless communication link with the first computing device.

Thus, the input device 100 may automatically disconnect an existing communication link and establish a communication link with a computing device on which the keyboard activity is confirmed.

Figure 2:
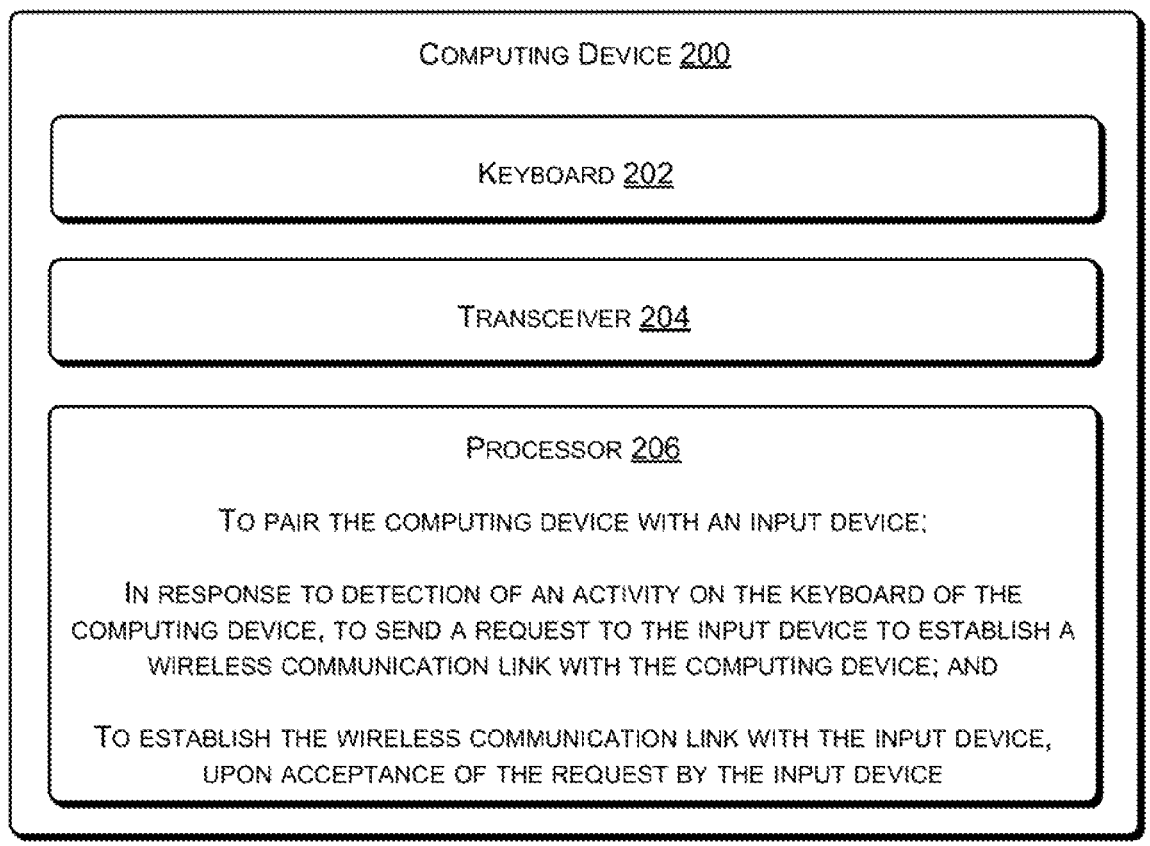
FIG. 2 illustrates a computing device for establishing a communication link based on an activity on a keyboard, according to an example.

FIG. 2 illustrates a computing device 200 for establishing a communication link based on an activity on a keyboard, according to an example. Examples of the computing device 200 may include, but are not limited to, a desktop computer, a personal computer (PC), a laptop, and so on. The computing device 200 may include a keyboard 202, a transceiver 204, and a processor 206 coupled to the transceiver 204. The keyboard 202 may be employed by a user of the computing device 200 for providing input to the computing device 200. The keyboard 202 may include a plurality of keys (not shown). In an example, the keyboard 202 may be integrated with the computing device 200 or may be an external keyboard.

In an example, the transceiver 204 may be a combination of a transmitter and a receiver. The transceiver 204 may include a common circuitry which is shared by the transmitter and the receiver. The transceiver 204 may send signals to and receive signals from the input device 100, based on communication with the processor 206.

The processor 206 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

The processor 206 may pair the computing device 200 with an input device, such as the input device 100. Upon pairing, the computing device 200 and the input device may create and store authentication information for being used for subsequent wireless communications. Further, the processor 206 may send a request to the input device to establish a wireless communication link with the computing device 200. For example, the processor 206 may send the request in the form of a beacon signal. The processor 206 may send the request in response to detection of an activity on the keyboard of the computing device 200. For example, when the keyboard 202 is being used by a user, such as for typing or pressing a key, the processor 206 may detect the activity on the keyboard 202 of the computing device 200.

Upon acceptance of the request by the input device, the processor 206 may establish the wireless communication link with the input device. For example, the acceptance of the request may be based on availability of the input device or termination of a prior established wireless communication link.

Figure 3:
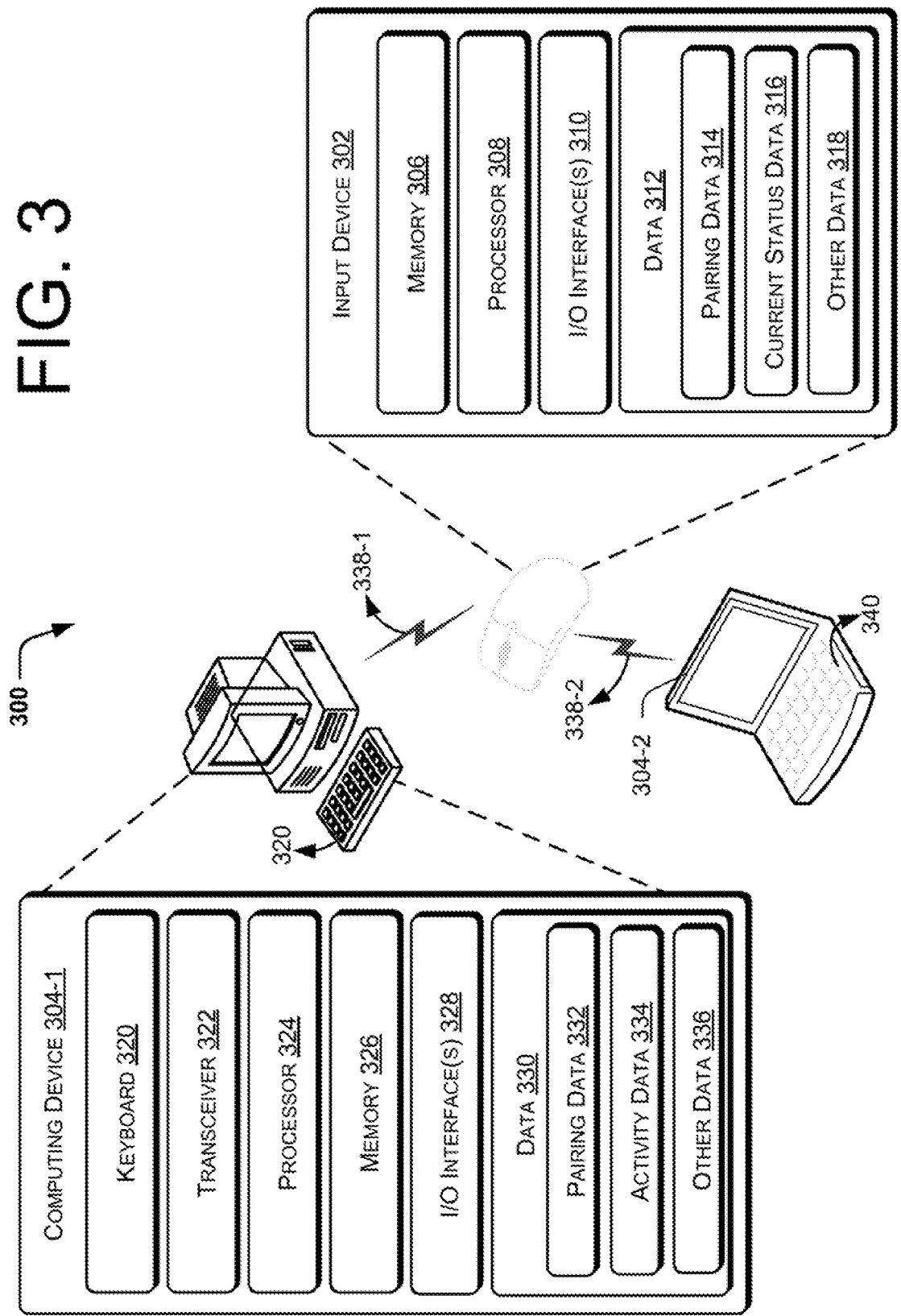
FIG. 3 illustrates a network environment 300 for establishing a communication link between an input device and a computing device based on an activity on a keyboard of the computing device, according to an example.

FIG. 3 illustrates a network environment 300 for establishing a communication link between an input device 302 and a computing device 304 based on an activity on a keyboard of the computing device 304, according to an example. The network environment 300 may include an input device 302, such as the input device 100. Examples of the input device 302 may include, but are not limited to, a wireless mouse, a wireless keyboard, a wireless game controller, and so on. The input device 302 may communicate with a plurality of computing devices, such as a first computing device 304-1 and a second computing device 304-2, collectively referred to as computing devices 304 and individually referred to as a computing device 304. The computing device 304 may be similar to the computing device 200. Examples of the computing devices 304 may include, but are not limited to, a desktop computer, a personal computer (PC), a laptop, a notebook, a gaming console, and so on.

The input device 302 may include a memory 306 and a processor 308. The memory 306 and the processor 308 may be similar to the memory 102 and the processor 104. The input device 302 also includes an interface 310. The interface 310 may include a variety of interfaces, for example, interfaces 310 for computing devices 304. The interface 310 may include data output devices. The interface 310 facilitates communication between the input device 302 and various communication and computing devices.

In an example, the input device 302 includes data 312. The data 312 may include a pairing data 314, a current status data 316, and other data 318. The other data 318 may include data generated and saved by the processor 308 for implementing various functionalities of the input device 302.

Further, the computing device 304 may include a keyboard 320, a transceiver 322, and a processor 324. The keyboard 320, the transceiver 322, and the processor 324 may be similar to the keyboard 202, the transceiver 204, and the processor 206. The computing device 304 also includes a memory 326, similar to the memory 306 of the input device 302. Further, the computing device 304 may include an interface 328. The interface 328 may include data output devices. The interface 328 facilitates the communication of the computing device 304 with various communication and input devices and various communication networks, such as networks that use a variety of protocols, for example, Real Time Streaming Protocol (RTSP), Hypertext Transfer Protocol (HTTP), Live Streaming (HLS) and Real-time Transport Protocol (RTP).

In an example, the computing device 304 includes data 330. The data 330 may include a pairing data 332, an activity data 334, and other data 336. The other data 336 may include data generated and saved by the processor 324 for implementing various functionalities of the computing device 304.

To be able to establish a wireless communication link, the input device 302 may pair with the computing devices 304. For example, a user of the computing devices 304 may pair the computing devices 304 with the input device 302 based on instructions provided in a user manual of the input device 302. In an example, the input device 302 may communicate with the computing devices 304 and agree to establish a connection and communicate with each other. The input device 302 and the computing devices 304 may create and store authentication information for being used for subsequent wireless communications. For example, the input device 302 and the computing devices 304 may exchange a password, in order to pair with each other. The processor 308 may store the password and an identification information of the computing device 304 as the pairing data 314 in the input device 302. For example, the pairing data 314 may be in the form of a repository in which identifier, such as a Media Access Control (MAC) address, of the paired devices is stored. Further, the processor 324 may store the password and information of the input device 302 as the pairing data 332.

After pairing with both the computing devices 304-1 and 304-2, when establishing a wireless communication link, such as a Bluetooth link, for a first time, the input device 302 may establish the wireless communication link with the first computing device 304-1 based on the activity on the keyboard 320 of the first computing device 304-1. In an example, the processor 308 may establish a first wireless communication link 338-1 with the first computing device 304-1.

In an example, the transceiver 322 of the second computing device 304-2 may continuously transmit a first beacon signal indicating pairing with the input device 302. The beacon signal may include information pertaining to a computing device from where the beacon signal is originating. For example, the first beacon signal may include a MAC address of the second computing device 304-2.

Further, when a user presses a key of a keyboard 340 of the second computing device 304-2, the processor 324 may detect an activity on the keyboard 340 of the second computing device 304-2. The processor 324 may store data pertaining to the activity on the keyboard 340, such as time of activity, as the activity data 334. As soon as the activity is detected by the processor 324, the transceiver 322 may send a request to the input device 30 to establish a second wireless communication link 338-2 with the second computing device 304-2.

In an example, the request may be in the form of a second beacon signal. The second beacon signal may include the MAC address of the second computing device 304-2 along with a current state of the second computing device 304-2. For example, the second computing device 304-2 may be considered to be in an active state or an inactive state, based on detection of the activity on the keyboard 342. For example, when the keyboard 340 of the second computing device 304-2 is in use, the second beacon signal may indicate that the second computing device 304-2 is in the active state. On the other hand, if the keyboard 340 of the second computing device 304-2 is not being used for a predefined time period, such as 10 milliseconds, the second beacon signal may indicate that the second computing device 304-2 is in the inactive state.

Upon receiving the request from the second computing device 304-2, the processor 308 of the input device 302 may validate an authenticity of the request. For example, to validate the authenticity, the processor 308 may compare the identifier of the second computing device 304-2 with the pairing data 314 stored in the input device 302. As mentioned above, the pairing data 314 includes a list of identifiers of all computing devices that are paired with the input device 302. Accordingly, the processor 308 may check whether the second computing device 304-2 is paired with the input device 302 or not. Once the processor 308 may confirm that the request is coming from a valid computing device, the processor 308 may check whether the first wireless communication link 338-1 is to be continued or terminated.

In an example, to check whether the first wireless communication link 338-1 is to be continued or terminated, the processor 308 may determine a current state of the first computing device 304-1. The processor 308 may determine inactive state of the first computing device 304-2 based on lapse of a predefined time period from a last user activity on the keyboard 320 of the first computing device 304-1. For example, the predefined time period may be 10 milliseconds. The processor 308 may communicate with a counter (not shown) of the input device 100 to determine the lapse of the predefined time period. If the predefined time period has lapsed, the processor 308 may determine that first computing device 304-1 may be in the inactive state. The processor 308 may store the determined status of the first computing device 304-1 as the current status data 316.

In response to determining the first computing device 304-1 in the inactive state, the processor 308 may accept the request received from the second computing device 304-2. Accordingly, the second wireless communication link 338-2 may be established between the input device 302 and the second computing device 304-2. Further, the processor 308 may automatically terminate the first wireless communication link 338-1.

In another example, the processor 308 may determine that the first computing device 304-1 is in the active state. For example, the processor 308 may determine that the predefined time period may not have lapsed since the last activity on the keyboard 320 of the first computing device 304-1. Accordingly, the processor 308 may reject the request received from the second computing device 304-2 and may continue communication over the first wireless communication link 338-1.

The input device 302 of the present subject matter may automatically switch between the computing devices 304-1 and 304-2 based on the activity on the keyboards 320 and 340 of the computing devices 304-1 and 304-2 respectively. Further, although the input device 302 is described to communicate with two computing devices 304-1 and 304-2, the input device 302 may be further capable of communicating with and switching between more than two computing devices.

Figure 4:
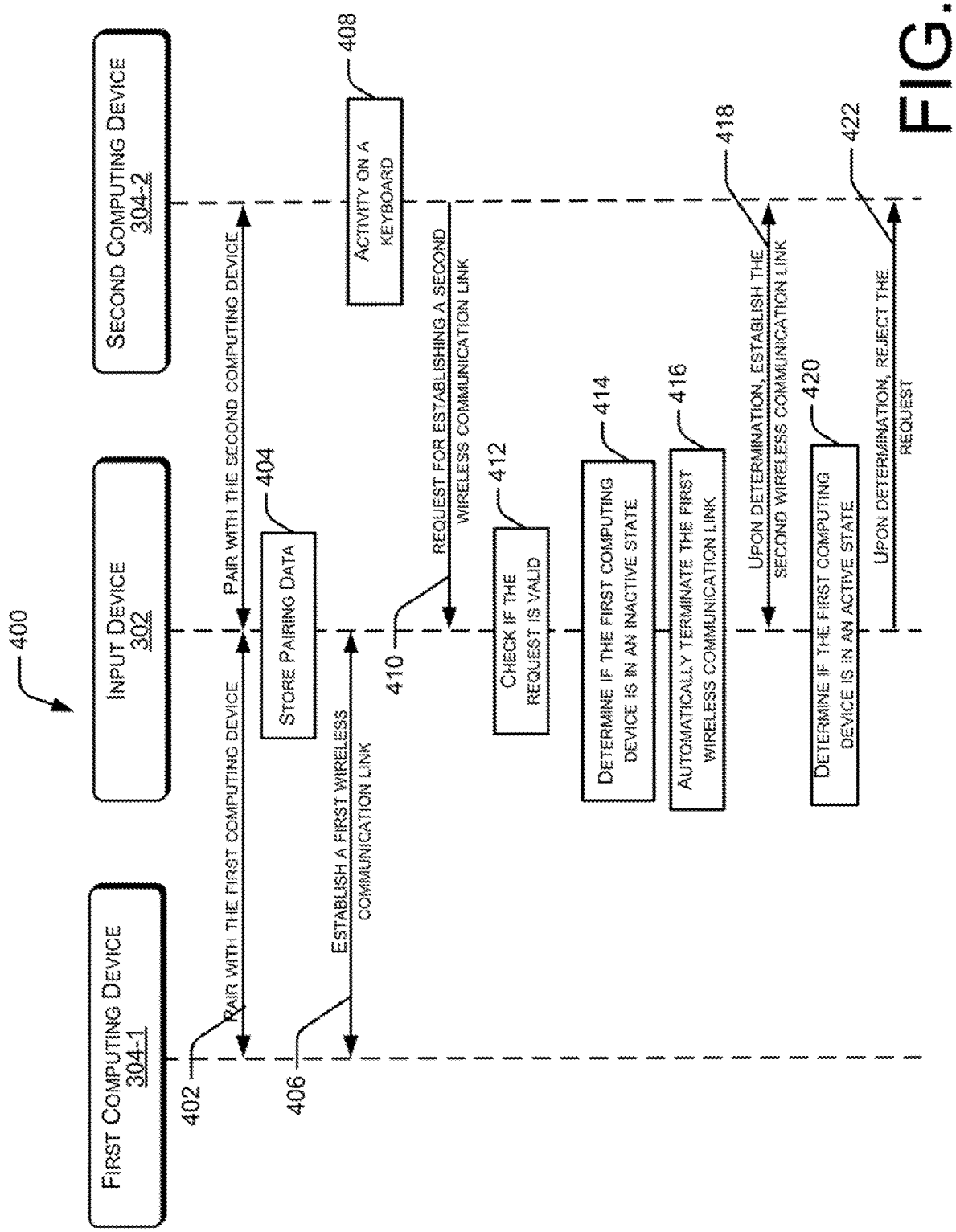
FIG. 4 illustrates a call flow diagram for establishing a communication link based on an activity on a keyboard, according to an example.

FIG. 4 illustrates a call flow diagram 400 for establishing a communication link based on an activity on a keyboard of a computing device, according to an example of the present subject matter. The various arrow indicators used in the call flow diagram 400 depicts the transfer of data between the various entities in the network environment 300, and between the input device 302 and the computing devices 304. The order in which the call flow diagram 400 is described is not intended to be construed as a limitation, and any number of the described steps may be combined in any order to implement the call flow diagram 400, or an alternative method. Although the description of FIG. 4 has been made in considerable detail with respect to the communication link 338, it will be understood that the steps for establishing a communication link based on an activity on a keyboard can be implemented in other networks as well, albeit with few alterations. Further, certain trivial steps have been omitted in the sequence diagrams, for the sake of brevity and clarity.

Referring to FIG. 4, at step 402, the input device 302 may pair with the first computing device 304-1 and the second computing device 304-2. As a result of pairing, the computing devices 304-1 and 304-2 and the input device 302 may set up an initial linkage to allow communication therebetween.

At step 404, the input device 302 may store the pairing data, such as the pairing data 314. In an example, the pairing data 314 may be stored in the memory 306 of the input device 302. The pairing data may include a list of identifiers, such as a Media Access Control (MAC) address, of the computing devices that are paired with the input device 302.

At step 406, a first wireless communication link, such as the first wireless communication link 338-1, may be established between the input device 302 and the first computing device 304-1. At step 408, an activity on a keyboard 340 of the second computing device 304-2 may be detected. In an example, the activity may be detected by the processor 324 of the second computing device 304-2. The activity may include pressing of a key on the keyboard 342.

At step 410, the second computing device 304-2 may send a request to the input device 302 for establishing a second wireless communication link, such as the second wireless communication link 338-2. The request may be sent by the transceiver 322, in response to the detection of the activity on the keyboard 340. In an example, the request may include an identifier, such as a MAC address of the second computing device 304-2.

Further, at step 412, the input device 302 may check if the request so received from the second computing device 304-2 is valid or not. For example, the processor 308 may compare the identifier of the second computing device 304-2, included in the request, with the pairing data 314 stored in the memory 306 of the input device 302.

At step 414, the input device 302 may determine if the first computing device 304-1 is in an inactive state or not. For example, the processor 308 may check whether a predefined time period, such as 10 milliseconds, has lapsed since the last activity on a keyboard 320 of the first computing device 304-1. If the predefined time period has lapsed, the first computing device 304-1 is considered to be in the inactive state.

At step 416, the input device 302 may upon determination of the inactive state of the first computing device 304-1, automatically terminate the first wireless communication link with the first computing device 304-1. Further, at step 418, the input device 302 may establish the second wireless communication link with the second computing device 304-2. In an example, the first wireless communication link and the second wireless communication link may be a Bluetooth link.

In addition, at step 420, the input device 302 may determine if the first computing device 304-1 is in an active state. For example, to determine the active state, the processor 306 may determine that the predefined time period may not have lapsed since the last activity on the keyboard of the first computing device 304-1.

At step 422, upon receiving the request and determining the first computing device 304-1 in the active state, the input device 302 may reject the request. For example, the processor 308 may send a rejection message to the second computing device 304-2 and may continue with the first wireless communication link.

Figure 5:
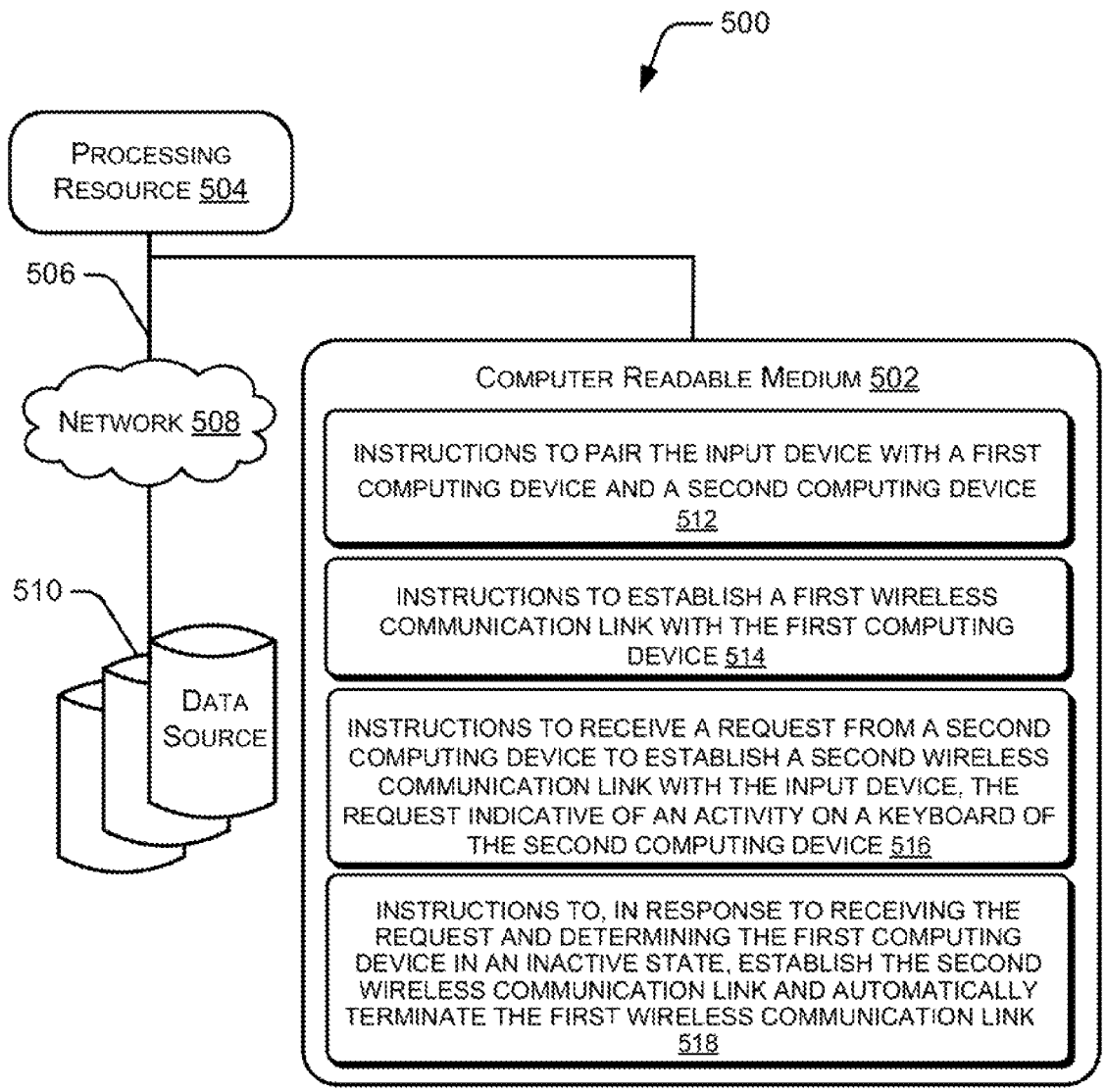
FIG. 5 illustrates a non-transitory computer readable medium for establishing a communication link based on an activity on a keyboard, according to an example.

FIG. 5 illustrates an example network environment 500 using a non-transitory computer-readable medium 502 for establishing a communication link based on an activity on a keyboard, according to an example of the present subject matter. The network environment 500 may be a public networking environment or a private networking environment. In one example, the network environment 500 includes a processing resource 504 communicatively coupled to the non-transitory computer-readable medium 502 through a communication link 506. For example, the processing resource 504 may be a processor of a computing system, such as the computing device, for fetching and executing computer-readable instructions from the non-transitory computer-readable medium 502.

The non-transitory computer-readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer-readable medium 502 through a network 508. The network 508 may be a single network or a combination of multiple networks and may use a variety of communication protocols.

The processing resource 504 and the non-transitory computer-readable medium 502 may also be communicatively coupled to data sources 510 over the network 508. The data sources 510 may include, for example, computing device. The data sources 510 may be used by the database administrators and other users to communicate with the processing resource 504.

In one example, the non-transitory computer-readable medium 502 includes a set of computer-readable and executable instructions for establishing a communication link based on an activity on a keyboard. The set of computer-readable instructions may include instructions as explained in conjunction with FIGS. 1 to 3. The set of computer-readable instructions, referred to as instructions hereinafter, may be accessed by the processing resource 504 through the communication link 506 and subsequently executed to perform acts for establishing a communication link based on an activity on a keyboard.

Referring to FIG. 5, in an example, the non-transitory computer-readable medium may include instructions 512 to pair an input device 302 with the first computing device 304-1 and the second computing device 304-2. Further, the non-transitory computer-readable medium 502 may include instructions 514 to establish a first wireless communication link with a first computing device 304-1. For example, the input device 302 may establish a wireless communication link with the computing device based on an activity on a keyboard of the computing device. The activity may include pressing a key on the keyboard. For example, when a user starts typing on the keyboard, the computing device may identify the typing as an activity.

The non-transitory computer-readable medium 502 may also include instructions 516 to receive a request from the second computing device 304-2 for establishing a second wireless communication link with the input device 302. For example, the input device 302 may receive the request while being in communication with the first computing device 304-1. The request may be indicative of an activity on a keyboard of the second computing device 304-2. For instance, when the user presses a key on the keyboard of the second computing device 304-2, the request may be received by the input device 302.

In an example, the request may be in the form of a beacon signal transmitted from the second computing device 304-2. The beacon signal may include an identifier, such as a MAC address, of the second computing device 304-2. Further, the beacon signal may include a current state of the second computing device 304-2.

The non-transitory computer-readable medium 502 may include instructions 518 to in response to determining the first computing device 304-1 in the inactive state, establish the second wireless communication link. Further, the processor 308 may automatically terminate the first wireless communication link with the first computing device 304-1. For example, the first computing device 304-2 may be considered to be in the active state or the inactive state, based on detection of the activity on the keyboard of the first computing device 304-1. For example, when the keyboard of the first computing device 304-1 is not being used for a predefined time period, such as 10 milliseconds, the processor 308 may consider the first computing device 304-1 to be in the inactive state.

In an example, the processor 308 may determine that the first computing device 304-1 is in the active state. For example, the processor 308 may determine that the predefined time period may not have lapsed since the last activity on the keyboard of the first computing device 304-1. Accordingly, the processor 308 may reject the request received from the second computing device 304-2 and continue communication over the first wireless communication link.

Although aspects for the present disclosure have been described in a language specific to structural features and/or methods, it is to be understood that the appended claims are not limited to the specific features or methods described herein. Rather, the specific features and methods are disclosed as examples of the present disclosure.

We claim:

1. An input device comprising:
   a memory; and
   a processor, coupled to the memory, to,
      establish a first wireless communication link with a first computing device;
      receive a request from a second computing device to establish a second wireless communication link with the input device, the request being indicative of an activity on a keyboard of the second computing device, and wherein the request is received while the input device is in communication with the first computing device; and
      in response to receiving the request and determining the first computing device in an inactive state, establish the second wireless communication link and automatically terminate the first wireless communication link, wherein determining the first computing device is in an inactive state comprises receiving a second request from the first computing device.

2. The input device as claimed in claim 1, wherein the memory comprises pairing data including a list of identifiers of computing devices paired with the input device.

3. The input device as claimed in claim 1, wherein the processor is to validate an authenticity of the request received from the second computing device.

4. The input device as claimed in claim 1, wherein the processor is to determine the inactive state of the first computing device based on lapse of a predefined time period from a last activity on a keyboard of the first computing device.

5. The input device as claimed in claim 4, wherein the predefined time period is 10 milliseconds.

6. The input device as claimed in claim 1, wherein the processor is to, in response to receiving the request and determining the first computing device in an active state, reject the request.

7. A non-transitory computer-readable medium comprising computer-readable instructions, which, when executed by a processor of an input device, cause the processor to:
   pair the input device with a first computing device and a second computing device;
   establish a first wireless communication link with the first computing device;
   receive a request from the second computing device to establish a second wireless communication link with the input device, the request indicative of an activity on a keyboard of the second computing device, and wherein the request is received while the input device is in communication with the first computing device; and
   in response to receiving the request and determining the first computing device in an inactive state, establish the second wireless communication link and automatically terminate the first wireless communication link, wherein determining the first computing device is in an inactive state comprises receiving a second request from the first computing device.

8. The non-transitory computer-readable medium as claimed in claim 7, wherein the request includes an identifier of the second computing device and a current state of the second computing device.

9. The non-transitory computer-readable medium as claimed in claim 7, wherein the instructions cause the processor to determine the inactive state of the first computing device based on lapse of a time period of 10 milliseconds from a last user activity on a keyboard of the first computing device.

10. The non-transitory computer-readable medium as claimed in claim 7, wherein the first wireless communication link and the second wireless communication link is a Bluetooth link.

11. The non-transitory computer-readable medium as claimed in claim 7, wherein the instructions which, when executed by the processor, cause the processor to, in response to receiving the request and determining the first computing device in an active state, reject the request.

12. A mouse comprising:
   a memory; and
   a processor, coupled to the memory, to,
      pair with a first computing device;
      pair with a second computing device;
      store pairing data in the memory including a list of identifiers of the first computing device and the second computing device;

establish a first wireless communication link with the first computing device;

receive a beacon signal from the second computing device to establish a second wireless communication link with the mouse, the beacon signal being indicative of an activity on a keyboard of the second computing device, and wherein the beacon signal is received while the mouse is in communication with the first computing device; and in response to receiving the beacon signal and determining the first computing device is in an inactive state, establish the second wireless communication link and automatically terminate the first wireless communication link wherein determining the first computing device is in an inactive state comprises receiving a second beacon signal from the first computing device.

13. The mouse as claimed in claim 12, wherein the processor is to validate an authenticity of the beacon signal received from the second computing device.

14. The mouse as claimed in claim 12, wherein the processor is to determine the inactive state of the first computing device based on lapse of a predefined time period from a last activity on a keyboard of the first computing device.

15. The mouse as claimed in claim 12, wherein the beacon signal comprises a media access control (MAC) address of the second computing device.

16. The mouse as claimed in claim 12, wherein the beacon signal comprises a current state of the second computing device.

* * * * *